US008407445B1

(12) United States Patent
Pathak et al.

(10) Patent No.: US 8,407,445 B1
(45) Date of Patent: Mar. 26, 2013

(54) SYSTEMS, METHODS, AND COMPUTER READABLE MEDIA FOR TRIGGERING AND COORDINATING POOL STORAGE RECLAMATION (75) Inventors: Saurabh Pathak, Cary, NC (US); David Haase, Fuquay Varina, NC (US); Miles de Forest, Bahama, NC (US); Robert F. Goudreau, Jr., Cary, NC (US); Paul T. McGrath, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 284 days.

(21) Appl. No.: 12/751,665

(22) Filed: Mar. 31, 2010

(51) Int. Cl.
*G06F 12/02* (2006.01)
(52) U.S. Cl. ......................... 711/170; 711/114
(58) Field of Classification Search .................. None
See application file for complete search history.

(56) References Cited

U.S. PATENT DOCUMENTS

| | | | |
|---|---|---|---|
| 5,604,902 A * | 2/1997 | Burkes et al. ........................ 1/1 |
| 6,681,242 B1 | 1/2004 | Kumar et al. |
| 6,880,062 B1 | 4/2005 | Ibrahim et al. |
| 7,284,244 B1 | 10/2007 | Sankaranarayan et al. |
| 7,340,522 B1 | 3/2008 | Basu et al. |
| 7,406,484 B1 | 7/2008 | Srinivasan et al. |
| 7,463,648 B1 | 12/2008 | Eppstein et al. |
| 7,480,912 B2 | 1/2009 | Arnold et al. |
| 7,849,180 B2 | 12/2010 | Sawyer et al. |
| 2001/0049779 A1 | 12/2001 | Shimada et al. |
| 2003/0056073 A1 | 3/2003 | Zeiger |
| 2003/0131165 A1 | 7/2003 | Asano et al. |
| 2004/0039891 A1 | 2/2004 | Leung et al. |
| 2004/0098537 A1 | 5/2004 | Serizawa |
| 2004/0153606 A1 | 8/2004 | Schott |
| 2004/0181476 A1 | 9/2004 | Smith et al. |
| 2004/0243699 A1 | 12/2004 | Koclanes et al. |
| 2005/0273556 A1 | 12/2005 | Gellai et al. |
| 2006/0085471 A1 * | 4/2006 | Rajan et al. ................... 707/102 |
| 2006/0112247 A1 | 5/2006 | Ramany et al. |
| 2006/0143424 A1 | 6/2006 | Matsuzaki |
| 2007/0043842 A1 | 2/2007 | Chouanard et al. |
| 2007/0143563 A1 * | 6/2007 | Pudipeddi et al. ............ 711/173 |
| 2007/0185934 A1 | 8/2007 | Cannon et al. |
| 2008/0082593 A1 * | 4/2008 | Komarov et al. ............. 707/204 |

(Continued)

OTHER PUBLICATIONS

Non-Final Official Action for U.S. Appl. No. 12/824,816 (Sep. 14, 2012).

(Continued)

*Primary Examiner* — Kaushikkumar Patel
(74) *Attorney, Agent, or Firm* — Jenkins, Wilson, Taylor & Hunt, P.A.

(57) ABSTRACT

Systems, methods, and computer readable media for triggering and coordinating pool storage reclamation are disclosed. According to one example, the method includes receiving an issued hint triggered by the execution of a data storage optimization operation applied to a mapped logical unit (MLU), wherein the MLU is one of a plurality of MLUs residing in a storage array, and computing an unused portion amount of an allocated storage space in the MLU, wherein the allocated storage space comprises a plurality of slices. If the unused portion amount exceeds a predetermined threshold value, detecting at least one of the slices to be released from the allocated storage space. The method also includes transferring data contained in a detected slice to at least one of the remaining slices in the allocated storage space, and removing the detected slice from the allocated storage space in the MLU to a common storage pool in the storage array, wherein the removed slice is allocated to any one of the plurality of MLUs.

15 Claims, 3 Drawing Sheets

U.S. PATENT DOCUMENTS

| | | | |
|---|---|---|---|
| 2009/0064159 | A1 | 3/2009 | LaFrese et al. |
| 2009/0077327 | A1* | 3/2009 | Hara .............................. 711/154 |
| 2009/0089516 | A1* | 4/2009 | Pelts et al. .................... 711/154 |
| 2009/0276588 | A1 | 11/2009 | Murase |
| 2010/0153641 | A1 | 6/2010 | Jagadish et al. |
| 2010/0262802 | A1* | 10/2010 | Goebel et al. ................. 711/166 |
| 2010/0299495 | A1* | 11/2010 | Frank ............................. 711/170 |
| 2011/0191536 | A1* | 8/2011 | Mizuno et al. ................. 711/114 |

OTHER PUBLICATIONS

Final Official Action for U.S. Appl. No. 12/100,514 (Aug. 10, 2012).
Non-Final Official Action for U.S. Appl. No. 12/164,959 (Jul. 24, 2012).
Final Official Action for U.S. Appl. No. 12/751,685 (Jun. 27, 2012).
Non-Final Official Action for U.S. Appl. No. 12/826,434 (Jun. 13, 2012).
Applicant-Initiated Interview Summary for U.S. Appl. No. 12/100,514 (Jun. 5, 2012).
Non-Final Official Action for U.S. Appl. No. 12/751,685 (Feb. 14, 2012).
Non-Final Official Action for U.S. Appl. No. 12/100,514 (Jan. 31, 2012).
Official Action for U.S. Appl. No. 12/164,959 (Sep. 12, 2011).
Commonly Assigned, Co-pending U.S. Appl. No. 13/168,329, for "Methods, Systems, and Computer Readable Medium for Controlling Prioritization of Tiering and Spin Down Features in a Data Storage System" (filed Jun. 24, 2011).
Final Official Action for U.S. Appl. No. 12/100,514 (May 25, 2011).
Non-Final Official Action for U.S. Appl. No. 12/100,514 (Nov. 16, 2010).
Commonly-assigned, Co-pending U.S. Appl. No. 12/826,434 for "Managing Multi-Tiered Storage Pool Provisioning," (filed Jun. 29, 2010).
Commonly Assigned, Co-pending U.S. Appl. No. 12/826,385 for "Systems, Methods, and Computer Readable Media for Compressing Data at Virtually Provisioned Storage Entity" (filed Jun. 29, 2010).
Commonly Assigned, Co-pending U.S. Appl. No. 12/824,816 for "Methods, Systems, and Computer Readable Medium for Tier-Based Data Storage Resource Allocation and Data Relocation in a Data Storage Array" (filed Jun. 28, 2010).
Commonly Assigned, Co-pending U.S. Appl. No. 12/751,685 for "Systems, Methods, and Computer Readable Media for an Adaptative Block Allocation Mechanism" (filed Mar. 31, 2010).
Commonly Assigned, Co-pending U.S. Appl. No. 12/164,959 for "Methods, Systems, and Computer Readable Medium for Dynamic, Policy-Based Allocation of System Resources" (filed Jun. 30, 2008).
Commonly Assigned, Co-pending U.S. Appl. No. 12/100,514 for "Methods, Systems, and Computer Readable Medium for Allocating Physical Storage in a Storage Array" (filed Apr. 10, 2008).
Notice of Allowance and Fee(s) Due for U.S. Appl. No. 12/824,816 (Jan. 17, 2013).
Notice of Allowance and Fee(s) Due for U.S. Appl. No. 12/164,959 (Jan. 11, 2013).

\* cited by examiner

SYSTEMS, METHODS, AND COMPUTER READABLE MEDIA FOR TRIGGERING AND COORDINATING POOL STORAGE RECLAMATION

TECHNICAL FIELD

The subject matter described herein relates to methods and systems for data storage and management. More particularly, the subject matter described herein relates to systems, methods, and computer readable media for triggering and coordinating pool storage reclamation.

BACKGROUND

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

Presently, there is a trend toward the use of larger operating systems, larger applications or programs, and larger file sizes. Understanding this trend, a storage administrator is likely to request the provisioning (i.e., allocation) of a larger portion of storage space than is currently required for an operating system, for example, with the expectation that the space requirements will grow with upgrades, bug-fixes, the inclusion of additional features, and the like.

However, a problem of underuse typically arises when the amount of storage space is fully provisioned and allocated to, but is not used by, an operating system, program, process, or user. In this scenario, the disk storage space is unused by the entity that requested its allocation and is also rendered unavailable for use by any other entity. In such cases, the unused space cannot be simply given back to a common storage pool where it may become accessible to other users. For example, a database installation may require many terabytes of storage over the long term even though only a small fraction of that space may be needed when the database is first placed into operation. In short, the large storage space may eventually be needed, but it is not known exactly when the entire space will be required. In the meantime, the allocated storage space lies unused by the requested user and may not be utilized by any other user.

In recognition of the fact that more storage space may be provisioned for operating systems, programs, and users than can actually be used at first, the concept of a sparsely populated logical unit (LU), such as a "thin" logical unit (TLU), was developed. Unlike the more traditional fully allocated logical unit, which is created by fully provisioning and an entire initial amount of storage area, a sparsely populated logical unit is provisioned at creation but is not allocated any physical storage until the storage is actually needed. Specifically, a TLU resolves this problem by allocating the storage space (e.g., making the memory space physically available) as it is needed when (or shortly before) data is written to the TLU. A TLU is created from a common pool of physical space and starts with minimal amount of physical space. As the application that is using the TLU starts to demand more storage, the TLU incrementally requests the storage space from the common storage pool in portions referred to as slices.

Although the TLU enables a user to avoid allocating unnecessary storage space from a common storage pool, there are still some instances where a TLU may comprise allocated areas of storage space (i.e., allocated slices) that are not being used. Notably, the TLU may be subjected to certain data storage optimization operations, such as a logical unit number (LUN) shrink, a LUN compression, or a LUN zeroing operation. In general, these operations can free up storage space in the TLU, thereby creating unused allocated slices. In many cases, this unused storage space cannot simply be given back to the common storage pool and allocated to other users. Thus, the use of these data storage optimization operations can result in the inefficient use of storage space within the TLU. Such a problem remains until the unused allocated slices in the TLU are eventually utilized (e.g., written to).

Accordingly, there exists a need for systems, methods, and computer readable media for triggering and coordinating pool storage reclamation.

SUMMARY

According to one embodiment, the subject matter described herein includes a system for triggering and coordinating pool storage reclamation that includes a hint mechanism configured for detecting the execution of a data storage optimization operation applied to a mapped logical unit (MLU), wherein the MLU is one of a plurality of MLUs residing in the storage entity, and for issuing a hint in response to detecting the execution of the data storage optimization operation. The system also includes an evacuation module configured for receiving the issued hint from the hint mechanism, computing an unused portion amount of an allocated storage space in the MLU, wherein the allocated storage space comprises a plurality of slices, detecting at least one of the slices to be released from the allocated storage space if the unused portion amount exceeds a predetermined threshold value, transferring data contained in a detected slice to at least one of the remaining slices in the allocated storage space, and removing the detected slice from the allocated storage space in the MLU to a common storage pool in the storage array, wherein the removed slice is allocated to any one of the plurality of MLUs.

According to another embodiment, the subject matter described herein includes a method for triggering and coordinating pool storage reclamation that includes receiving an issued hint triggered by the execution of a data storage optimization operation applied to a mapped logical unit (MLU), wherein the MLU is one of a plurality of MLUs residing in a storage array, and computing an unused portion amount of an allocated storage space in the MLU, wherein the allocated storage space comprises a plurality of slices. If the unused portion amount exceeds a predetermined threshold value, detecting at least one of the slices to be released from the allocated storage space. The method also includes transferring data contained in a detected slice to at least one of the remaining slices in the allocated storage space, and removing the detected slice from the allocated storage space in the MLU to a common storage pool in the storage array, wherein the removed slice is allocated to any one of the plurality of MLUs.

The subject matter described herein for triggering and coordinating pool storage reclamation may be implemented in hardware alone or in combination with software and/or firmware. As such, the terms "function" or "module" as used herein refer to hardware or hardware combined with software and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable storage media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for triggering and coordinating pool storage reclamation are provided. Reference will now be made in detail to exemplary embodiments of the present subject matter, examples of which are illustrated in the accompanying drawings. Wherever possible, the same reference numbers will be used throughout the drawings to refer to the same or like parts.

Figure 1:
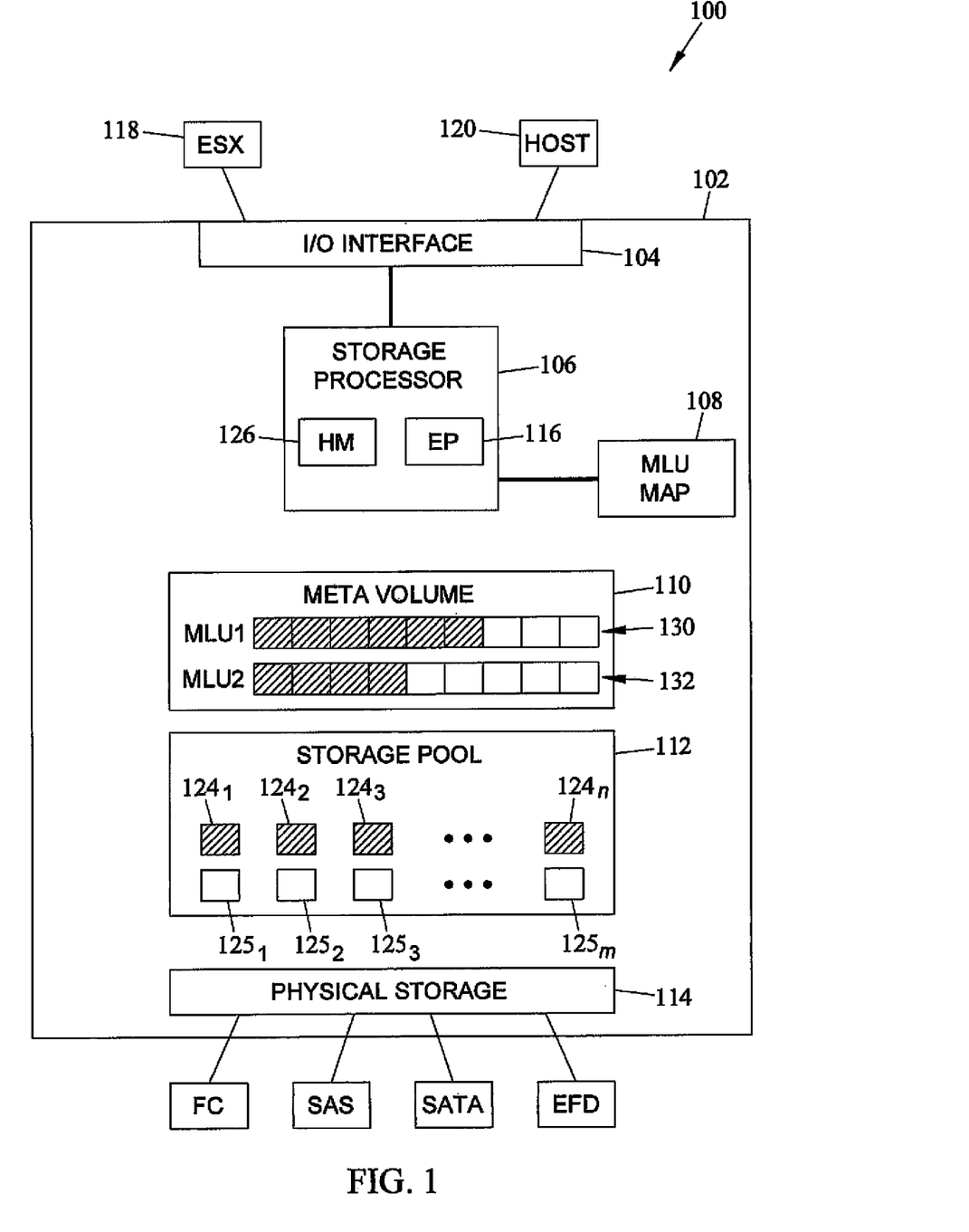
FIG. 1 is a block diagram illustrating an exemplary system for triggering and coordinating pool storage reclamation according to an embodiment of the subject matter described herein.

FIG. 1 is a block diagram illustrating a data storage system 100 according to an embodiment of the subject matter described herein. The configuration of storage system 100, as illustrated in FIG. 1, is for illustrative purposes only, and is not considered a limitation of the subject matter described herein. Storage system 100 includes a storage array 102 that contains a plurality of physical storage devices 114, which may include hard disk drives, tape drives, flash memory, flash drives, other solid state drives, or some combination of the above. Although FIG. 1 depicts that physical storage devices 114 include a fiber channel device, a serial attached SCSI device, a serial ATA device, and an enterprise flash drive device, the scope of the present subject matter is not limited to these storage types. Storage array 102 may include one or more storage processors 106 for handling input/output (I/O) requests and other communications from external entities (e.g., an ESX server 118, a host 120, etc.) via I/O interface 104. Storage processor 106 may communicate with storage devices 114 through one or more data buses (not shown) and may be configured to trigger and coordinate storage allocation tasks. In one embodiment, storage processor 106 includes a hint mechanism 126 for detecting the execution of data storage optimization operations and for issuing hints. Storage processor 106 may also include an evacuation process or module 116 configured to perform evacuation procedure in a mapped logical unit (MLU) when triggered. As described herein, an MLU may be a thin logical unit, a direct logical unit, or any other kind of sparsely populated logical unit. In one embodiment, storage processor 106 maintains a mapped logical unit (MLU) map 108 that contains the associations/mappings between the physical storage devices 114 and the slices assigned to each MLU in meta volume 110.

In one embodiment, physical storage devices 114 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device. Storage entities may be sub-divided into logical units. In one embodiment, the collective storage capacity of physical storage devices 114 may logically be represented by a common storage pool 112 that includes a plurality of logical portions, referred to as logical units (not shown). Each logical unit in the common storage pool 112 may be further subdivided into a smaller logical unit or portion, referred to as a slice. In one embodiment, common storage pool 112 includes slices $124_1 \ldots n$, that have been allocated to an MLU and empty slices $125_1 \ldots m$, that have yet to be assigned to an MLU. In the embodiment illustrated in FIG. 1, for example, each slice 124 is 1 gigabyte (GB) in size, but other sizes may be used without departing from the scope of the present subject matter. In the embodiment illustrated in FIG. 1, data storage system 100 further includes meta volume 110 that contains two MLUs, MLU1 130 and MLU2 132. One or more slices are allocated to each of MLU1 130 and MLU2 132. As users of storage array 102 indirectly request more storage space to provision their MLU, storage processor 106 allocates one or more free slices 125 from the common storage pool 112 to the appropriate MLU in meta volume 110.

In addition to adding space to the MLU storage incrementally, storage processor 106 also has the ability to reclaim unused storage from the MLU and add it back to the common pool. The present subject matter implements an optimized solution to trigger and coordinate the reclamation of the unused storage from the MLU to add it back to the common storage pool. Once added to the common storage pool in chunks of 1 GB slices, it is available for provisioning to any MLU on the system.

There are several data storage optimization operations that may be executed within the storage array 102 that creates free storage space on a MLU. For example, a LUN shrink operation may be utilized by a client to reconfigure the size of the MLU by shrinking it to a smaller size if an application's storage requirement changes over time. A LUN shrink operation is typically a user initiated operation that is executed when the user decides to reduce the size of the MLU. When used with the present subject matter, the execution of a shrink operation may result in some storage space being freed on the MLU if the shrunk space was previously allocated (or written to). For example, if a MLU of 10 GB size is shrunk to 5 GB, up to five 1 GB slices may be freed depending on the amount of storage space that was allocated in the "5 GB to 10 GB" region of the MLU. This unused storage space may be made available for use by any MLU in the storage array once it is added back to the common storage pool by the present subject matter.

Another data storage optimization operation that may be used to free storage space on an MLU is a LUN compression operation. Compression is an operation that is enabled (and disabled) by a user on a per MLU basis. When enabled, compression is an ongoing process that monitors new and existing data stored on the MLU and may reduce the MLU's size by encoding the stored data into fewer bits. When used with the present subject matter, the LUN compression operation may free portions of the allocated space on an MLU that previously contained data (prior to compression). In one embodiment, the compression operation encodes data into fewer bits which utilizes less storage space than the unencoded representation of that data. Thus, the slices that were previously allocated may become unused after compression and can then be returned back to common storage pool via the present subject matter. Specifically, the unused space in the slices may be freed using a hole punching technique. Hole punching is the process of unallocating or deleting blocks instead of storing zero bits. Notably, sufficient amount of hole punching activity may result in unused slices in the MLU.

Yet another data storage optimization operation that may be used to free storage space on an MLU is a LUN zeroing operation. An MLU may equate an unallocated region (e.g., one or more slices) on the MLU to the presence of zeroes (i.e., 0 bits) in that region. For example, if an instruction is received to read an MLU region that has not yet been allocated, the MLU would recognize that the space has not been written to and, therefore, the space is fully comprised of zero bit data. Also, if an application or host writes zeroes on the MLU, the blocks allocated for that region may be deleted instead of writing zeroes in that region. As mentioned above, the process of unallocating/deleting blocks instead of storing zeroes is called hole punching and a sufficient amount of hole punching activity may result in unused slices in the MLU. These slices may then be returned back to the common storage pool via the present subject matter.

The manner in which the present subject matter returns unused allocated storage space (e.g., slices back to common storage pool 112), is by performing an evacuation procedure. In general, evacuation is a background task that is applied on a per MLU basis and is triggered by hint mechanism 126 when any of the above data storage optimization operations occur. For example, a client may initiate a data storage optimization operation to be performed on the MLU. The data storage optimization operation is detected by hint mechanism 126 in the storage processor 106, which in turn issues, or drops, a hint. In one embodiment, the hint is also dropped by hint mechanism 126, which may be configured to record the intent of the hint initiator (i.e., the entity executing the data storage optimization operation) in order to generate a "work item." Since the hint initiator may be running in a time-critical context, such as an I/O thread, hint mechanism 126 is configured to return control back to the hint initiator as soon as possible. At a later time, the generated "work item" is picked up for processing by a less time-critical thread that performs a background evacuation procedure in a transactional context. Once in the transactional context, evacuation process 116 initiates evacuation by computing the amount of unused allocated storage space in the MLU. Evacuation process 116 may also select the allocated slices that can be evacuated based on the amount of unused space within the MLU. For example, evacuation process 116 may also be configured to move any data from partially unused allocated slices that have been selected to other allocated slices that the MLU is already using to store data. This process is depicted in detail in FIG. 2.

Figure 2:
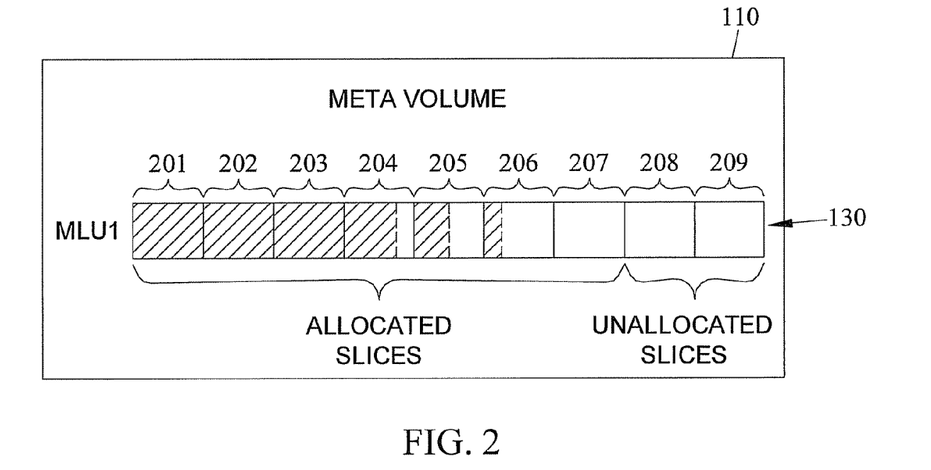
FIG. 2 is a block diagram illustrating a block diagram of an exemplary meta volume in a storage array system according to an embodiment of the subject matter described herein.

More specifically, FIG. 2 is a block diagram illustrating a block diagram of an exemplary meta volume in a storage array 102. In the meta volume 110 illustrated in FIG. 2, MLU1 130 is represented as comprising nine logical data slices 201-209. Specifically, slices 201-207 are allocated data slices and slices 208-209 are unallocated slices. After a data storage optimization operation (e.g., LUN compression) is initiated, data present in MLU1 130 is compressed in a manner which results in the creation of free storage space in MLU1 130. For example, suppose slices 204-206 have a portion of free space existing after the LUN compression operation, and slice 207 has become (or always has been) completely empty. After the hint is issued by the hint mechanism and the total allocated free space is computed by the evacuation process, data may be transferred from one slice to another slice in an attempt to clear a slice for evacuation. For example, evacuation process 116 may detect and designate slice 206 for evacuation data transfer and designate slice 204 and/or slice 205 for receiving transferred data from slice 206. After this detection and designation stage, the data blocks in slice 206 may then be moved by the evacuation process to at least one of slices 204 and 205 in order clear slice 206. In one embodiment, evacuation process 116 utilizes an underlying common block file system (CBFS) process (not shown) to perform this data transfer process. Namely, after detecting that at least one slice may freed/cleared, evacuation process 116 may call on a CBFS process to identify and select the actual slice in the MLU to be evacuated. The CBFS process then proceeds to transfer the data blocks from the slice to be freed. Once slice 206 is placed in a condition (i.e., an allocated slice that is completely clear of data blocks) to be evacuated after the transfer of data, the evacuation process proceeds to remove/unallocate the cleared slice to the common storage pool. Similarly, slice 207 is also in a condition for evacuation since it is clear of data blocks (even though slice 207 did not require a data transfer).

Returning to FIG. 1, after the selected allocated slices are free of data (i.e., data has been moved), evacuation process 116 designates these unused slices as unallocated, and effectively moves the slices back to common storage pool 112. Evacuation process 116 performs this procedure until the MLU does not include any allocated slices that are completely free of data. At this point, evacuation process 116 waits for a new hint to trigger the evacuation procedure again.

In addition to the disclosed evacuation procedure, exemplary embodiments of the present subject matter may further include one or more evacuation optimization procedures. In one embodiment, hint mechanism 126 may be configured to track the number of holes punched in each MLU after a LUN consolidation or LUN zeroing operation is executed, and drop a hint only if the amount of hole punching can result in one or more slices being freed. For example, storage space is typically freed in smaller chunks (e.g., 4 KB, 8 KB, etc.) if it is a result of LUN compression or zeroing. Since the space is reclaimed in chunks of 1 GB, hint mechanism 126 tracks the amount of hole punches for each MLU and only triggers a hint if the amount of space freed is over 1 GB (i.e., or any other designated threshold value) for that MLU. For instance, an application on host 120 that operates at 4 KB block size may free 4 KB at a time. Therefore, 256 hole punches (i.e., 4 KB*256=1 GB) will free one slice. Hint mechanism 126 tracks this activity and triggers a hint only when 256th hole is punched. Thus, the tracking of free space by hint mechanism 126 reduces the number of hint triggers generated until a 1 GB slice threshold is reached by hole punching activity. Notably, hole punching activity is typically associated with the compression and zeroing operations. In contrast, the shrink operation typically frees a few GBs of storage space at a time and thus, is very likely to release a few 1 GB slices back to common storage pool 112. Therefore, the fine granularity check associated with hole punching is not necessary for shrink operations.

In one embodiment, storage processor 106 may perform another optimization procedure prior to triggering an evacuation. Namely, hint mechanism 126 may combine concurrent hint requests originating from multiple (or the same) hint initiators into one "work item." For example, any time a hint is dropped, hint mechanism 126 records the intent of the client to initiate an evacuation by generating a work item. Hint mechanism 126 may also be configured to maintain a queue of work items and dispatches the hints to evacuation process 116. However, if upon receiving a hint request and creating its associated work item, there is already a pending work item for a common MLU, hint mechanism 126 will detect this condition and merge the two work items into one bulk work item. By aggregating the hint requests in this matter, a single bulk request to evacuation process 116 is made. Such a bulk request consumes less CPU cycles and resources as opposed to what would normally be consumed if each hint request was processed separately by evacuation process 116.

In one embodiment, storage processor 106 may perform an optimization procedure after an evacuation is triggered. For example, evacuation process 116 can perform the evacuation for multiple hints being issued. When active, evacuation process 116 selects a point in time to compute the free allocated space existing on an MLU and evacuates the amount of unused allocated space at that point in time. However, if additional free space is becoming available on the MLU due to additional operations and thereby resulting in more hints being dropped, evacuation process 116 detects this condition at the end of evacuation procedure/cycle and may immediately execute a second evacuation cycle to reclaim the new free space. Evacuation process 116 may be configured to perform this optimization procedure until there is no free allocated space left within the MLU.

FIG. 2 is a block diagram illustrating a block diagram of an exemplary meta volume in a storage array 102. In the meta volume 110 illustrated in FIG. 2, MLU1 130 is represented as comprising nine logical data slices 201-209. Specifically, slices 201-207 are allocated data slices and slices 208-209 are unallocated slices. After a data storage optimization operation (e.g., LUN compression) is initiated, data present in MLU1 is compressed in a manner which results in the creation of free storage space in MLU1. For example, suppose slices 204-206 have a portion of free space existing after the LUN compression operation, and slice 207 has become (or always has been) completely empty. After the hint is issued by the hint mechanism and the total allocated free space is computed by the evacuation process, data may be transferred from one slice to another slice in an attempt to clear a slice for evacuation. For example, evacuation process 116 may designate slice 206 for evacuation data transfer and designate slice 204 and/or slice 205 for receiving transferred data from slice 206. After this designation stage, the data blocks in slice 206 may then be moved by the evacuation process to at least one of slices 204 and 205 in order clear slice 206. Consequently, slice 206 is placed in a condition (i.e., an allocated slice that is completely clear of data blocks) to be evacuated after the transfer of data. Similarly, slice 207 is also in a condition for evacuation since it is clear of data blocks (even though slice 207 did not require a data transfer).

Figure 3:
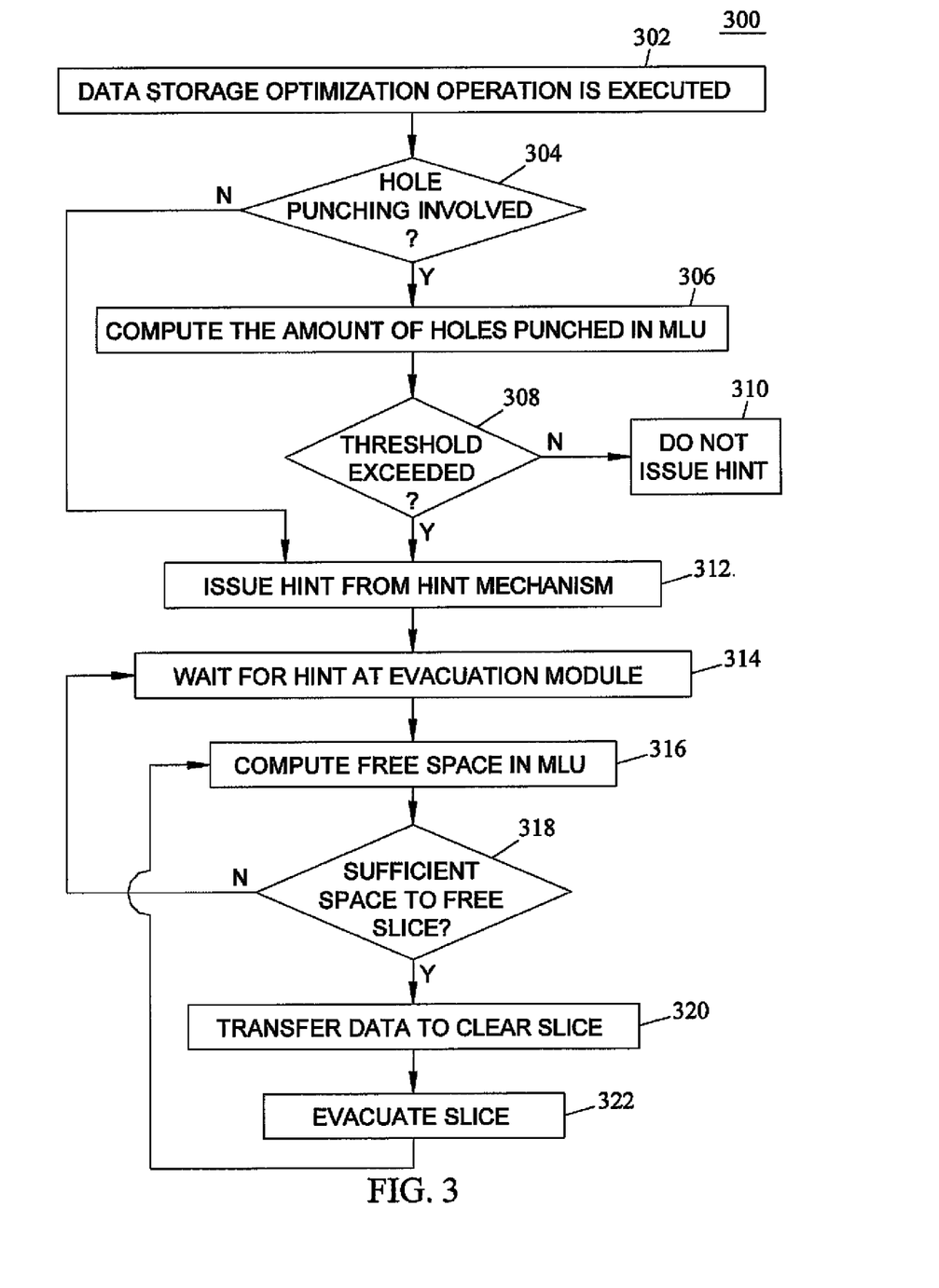
FIG. 3 is a flow diagram illustrating an exemplary method for triggering and coordinating pool storage reclamation according to an embodiment of the subject matter described herein.

In order to better illustrate the evacuation process and the associated optimizations, FIG. 3 is provided. FIG. 3 is a flow chart illustrating an exemplary method for triggering and coordinating pool storage reclamation. In block 302, a data storage optimization operation is initiated. In one embodiment, a hint initiator in storage system 100 initiates a LUN shrink operation or a LUN compression operation. In an alternate embodiment, host 120 may initiate a zeroing operation. As mentioned above, each of these data storage optimization operations frees up allocated space in an MLU in some manner.

In block 304, a determination is made as to whether hole punching activity is involved with the data storage optimization operation. Notably, LUN compression and LUN zeroing operations involving some degree of hole punching, while a LUN shrink operation does not. If hole punching is involved, method 300 proceeds to block 306. If hole punching is not associated with the data storage optimization operation, then method 300 continues to block 312.

In block 306, the amount of holes punched in the MLU is determined. In one embodiment, hint mechanism 126 is configured to track the amount of holes punched in each MLU associated with the data storage optimization operation. For example, hint mechanism 126 may compute the total amount of hole punching space created in the MLU after a LUN zeroing operation or a LUN compression operation is performed.

In block 308, a determination is made as to whether a storage space threshold is exceeded (or met). In one embodiment, hint mechanism 126 determines if the total amount of hole punching space computed in block 306 exceeds a predetermined threshold value. In one embodiment, the threshold value may correspond to the amount of space required to free a slice in the MLU, for example, 1 GB. If the threshold value is exceeded, then method 300 continues to block 312, otherwise method 300 proceeds to block 310 and a hint is not issued by hint mechanism 126.

In block 312, a hint is issued. In one embodiment, hint mechanism 126 issues a hint which is received by evacuation process 116 awaiting the hint in block 314.

In block 316, the allocated free space in the MLU is computed. In one embodiment, evacuation process 116 is triggered by the hint to determine the amount of allocated free space in an MLU. For example, evacuation process 116 may compute the total amount of free allocated space after receiving a hint that a LUN shrink operation, a LUN compression operation, or LUN zeroing operation is performed.

In block 318, a determination as to whether there is sufficient free space to release an allocated slice from the MLU is made. In one embodiment, evacuation process 116 is configured to detect if an allocated slice can be released from the allocated storage space by comparing the amount of free space computed in block 316 with a 1 GB threshold value (i.e., the predesignated slice size). If there is sufficient space to free a slice (i.e., the threshold value is met/exceeded), method 300 continues to block 320. Otherwise, method 300 loops back to block 314.

In block 320, data in the MLU may be transferred among the allocated slices to clear one or more slices of data. In one embodiment, the evacuation process may transfer data from a lightly populated slice (e.g., a slice with only a few written blocks) to a more heavily populated slice (e.g., a slice with a few free/unwritten block spaces) such that the former lightly populated slice is completely free of data. In one embodiment, the data is transferred by an underlying CBFS service. This transfer process is discussed above in greater detail in FIG. 2.

In block 322, the slices are evacuated. In one embodiment, evacuation process 116 evacuates the "data-free" slices of block 320 to the common storage pool 112. Notably, this evacuation procedure designates these free slices as unallocated, which may now be requested for allocation by another MLU. In one embodiment, method 300 then loops back to block 316 to determine if the MLU has any remaining unused allocated space.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for triggering and coordinating pool storage reclamation, the method comprising:
receiving an issued hint triggered by the execution of a data storage optimization operation applied to a mapped logical unit (MLU), wherein the MLU is one of a plurality of MLUs residing in a storage array;
computing an unused portion amount of an allocated storage space in the MLU, wherein the allocated storage space comprises a plurality of slices;
if the unused portion amount exceeds a predetermined threshold value, detecting at least one of the plurality of slices to be released from the allocated storage space;
transferring data contained in the at least one detected slice to at least one remaining slice of the plurality of slices in the allocated storage space; and
removing the at least one detected slice from the allocated storage space in the MLU to a common storage pool in the storage array, wherein the at least one removed slice is allocated to any one of the plurality of MLUs, wherein, prior to receiving the issued hint, tracking an amount of holes punched on the MLU by the data storage optimization operation, and only issuing a hint if the amount exceeds a predetermined hole punching threshold value.

2. The method of claim 1 wherein, prior to receiving the issued hint, detecting that a plurality of hint requests are associated with the MLU, combining the hint requests into a single bulk request, and sending the single bulk request as the issued hint.

3. The method of claim 1 wherein the storage array includes at least one of a hard disk drive, a tape drive, a flash memory, a flash drive, and solid state drive.

4. The method of claim 1 wherein the data storage optimization operation includes at least one of a shrink operation, a compression operation, and a zeroing operation.

5. A method for triggering and coordinating pool storage reclamation, the method comprising:
receiving an issued hint triggered by the execution of a data storage optimization operation applied to a mapped logical unit (MLU), wherein the MLU is one of a plurality of MLUs residing in a storage array;
computing an unused portion amount of an allocated storage space in the MLU, wherein the allocated storage space comprises a plurality of slices;
if the unused portion amount exceeds a predetermined threshold value, detecting at least one of the plurality of slices to be released from the allocated storage space;
transferring data contained in the at least one detected slice to at least one remaining slice of the plurality of slices in the allocated storage space; and
removing the at least one detected slice from the allocated storage space in the MLU to a common storage pool in the storage array, wherein the at least one removed slice is allocated to any one of the plurality of MLUs, wherein computing the unused portion amount is performed at a point in time, removing the at least one detected slice is performed according to the unused portion amount computed at the point in time, and repeating the computing, detecting, transferring, and removing steps if at least a second issued hint is received after the point in time.

6. A system for performance optimization for triggering and coordinating pool storage reclamation, the system comprising:
a hint mechanism configured for detecting the execution of a data storage optimization operation applied to a mapped logical unit (MLU), wherein the MLU is one of a plurality of MLUs residing in the storage entity, and for issuing a hint in response to detecting the execution of the data storage optimization operation; and
an evacuation module configured for:
receiving the issued hint from the hint mechanism, computing an unused portion amount of an allocated storage space in the MLU, wherein the allocated storage space comprises a plurality of slices, detecting at least one of the plurality of slices to be released from the allocated storage space if the unused portion amount exceeds a predetermined threshold value, transferring data contained in the at least one detected slice to at least one remaining slice of the plurality of slices in the allocated storage space, and removing the at least one detected slice from the allocated storage space in the MLU to a common storage pool in the storage array, wherein the at least one removed slice is allocated to any one of the plurality of MLUs, wherein the hint mechanism is further configured for tracking an amount of holes punched on the MLU by the data storage optimization operation, and only issuing a hint if the amount exceeds a predetermined hole punching threshold value.

7. The system of claim 6 wherein the hint mechanism is further configured for detecting that a plurality of hint requests are associated with the MLU, combining the hint requests into a single bulk request, and sending the single bulk request as the issued hint.

8. The system of claim 6 wherein the storage array includes at least one of a hard disk drive, a tape drive, a flash memory, a flash drive, and solid state drive.

9. The system of claim 6 wherein the data storage optimization operation includes at least one of a shrink operation, a compression operation, and a zeroing operation.

10. A system for performance optimization for triggering and coordinating pool storage reclamation, the system comprising:
a hint mechanism configured for detecting the execution of a data storage optimization operation applied to a mapped logical unit (MLU), wherein the MLU is one of a plurality of MLUs residing in the storage entity, and for issuing a hint in response to detecting the execution of the data storage optimization operation; and
an evacuation module configured for:
receiving the issued hint from the hint mechanism, computing an unused portion amount of an allocated storage space in the MLU, wherein the allocated storage space comprises a plurality of slices, detecting at least one of the plurality of slices to be released from the allocated storage space if the unused portion amount exceeds a predetermined threshold value, transferring data contained in the at least one detected slice to at least one remaining slice of the plurality of slices in the allocated storage space, and removing the at least one detected slice from the allocated storage space in the MLU to a common storage pool in the storage array, wherein the at least one removed slice is allocated to any one of the plurality of MLUs, wherein the evacuation module is further configured for computing the unused portion amount is performed at a point in time, removing the at least one detected slice is performed according to the unused portion amount computed at the point in time, and repeating the computing, detecting, transferring, and removing steps if at least a second issued hint is received after the point in time.

11. A computer readable medium having stored thereon executable instructions that when executed by the processor of a computer control the computer to perform steps comprising:
receiving an issued hint triggered by the execution of a data storage optimization operation applied to a mapped logical unit (MLU), wherein the MLU is one of a plurality of MLUs residing in a storage array;
computing an unused portion amount of an allocated storage space in the MLU, wherein the allocated storage space comprises a plurality of slices;
if the unused portion amount exceeds a predetermined threshold value, detecting at least one of the plurality of slices to be released from the allocated storage space;
transferring data contained in the at least one detected slice to at least one remaining slice of the plurality of slices in the allocated storage space; and
removing the at least one detected slice from the allocated storage space in the MLU to a common storage pool in the storage array, wherein the at least one removed slice is allocated to any one of the plurality of MLUs, wherein, prior to receiving the issued hint, tracking an amount of holes punched on the MLU by the data storage optimization operation, and only issuing a hint if the amount exceeds a predetermined hole punching threshold value.

12. The computer readable medium of claim 11 wherein, prior to receiving the issued hint, detecting that a plurality of hint requests are associated with the MLU, combining the hint requests into a single bulk request, and sending the single bulk request as the issued hint.

13. The computer readable medium of claim 11 wherein the storage array includes at least one of a hard disk drive, a tape drive, a flash memory, a flash drive, and solid state drive.

14. The computer readable medium of claim 11 wherein the data storage optimization operation includes at least one of a shrink operation, a compression operation, and a zeroing operation.

15. A computer readable medium having stored thereon executable instructions that when executed by the processor of a computer control the computer to perform steps comprising:
receiving an issued hint triggered by the execution of a data storage optimization operation applied to a mapped logical unit (MLU), wherein the MLU is one of a plurality of MLUs residing in a storage array;
computing an unused portion amount of an allocated storage space in the MLU, wherein the allocated storage space comprises a plurality of slices;
if the unused portion amount exceeds a predetermined threshold value, detecting at least one of the plurality of slices to be released from the allocated storage space;
transferring data contained in the at least one detected slice to at least one remaining slice of the plurality of slices in the allocated storage space; and
removing the at least one detected slice from the allocated storage space in the MLU to a common storage pool in the storage array, wherein the at least one removed slice is allocated to any one of the plurality of MLUs, wherein computing the unused portion amount is performed at a point in time, removing the at least one detected slice is performed according to the unused portion amount computed at the point in time, and repeating the computing, detecting, transferring, and removing steps if at least a second issued hint is received after the point in time.

* * * * *